May 23, 1961  R. BEACOM  2,985,460
ENLARGED CHUCK

Filed June 24, 1960  2 Sheets-Sheet 1

INVENTOR.
ROBERT BEACOM
BY Woodling and Krost,
ATTORNEYS

May 23, 1961  R. BEACOM  2,985,460
ENLARGED CHUCK
Filed June 24, 1960  2 Sheets-Sheet 2
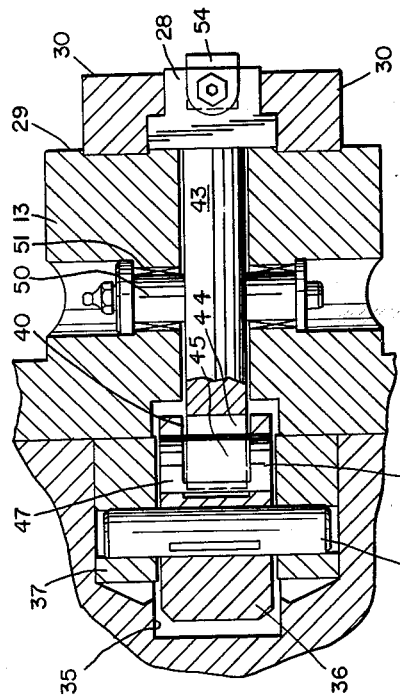
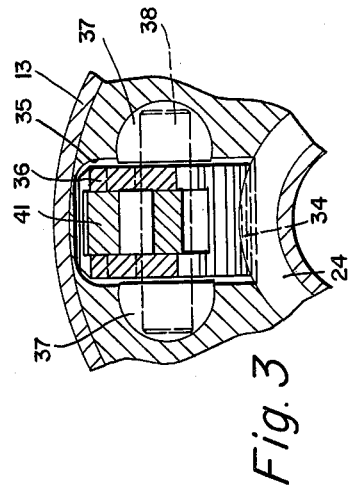
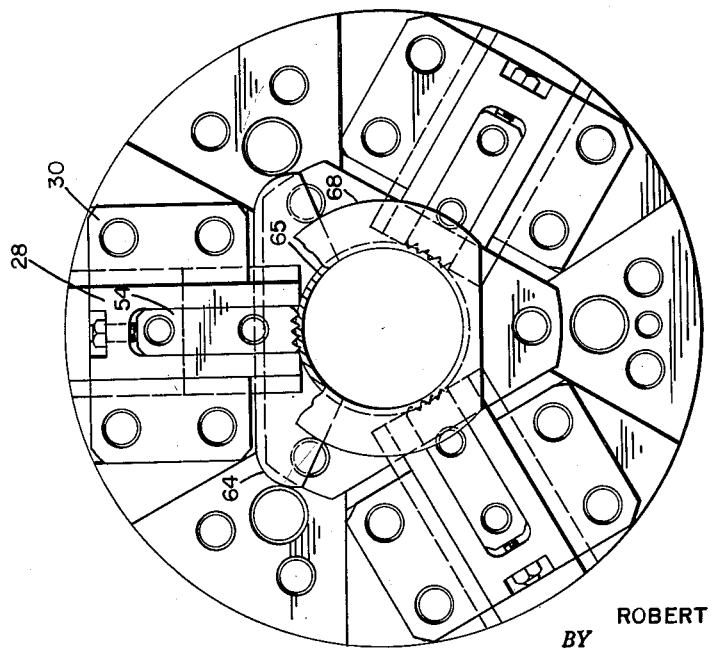
INVENTOR.
ROBERT BEACOM
BY Woodling and Krost,
ATTORNEYS

2,985,460
ENLARGED CHUCK

Robert Beacom, Bedford, Ohio, assignor to The National Acme Company, a corporation of Ohio Filed June 24, 1960, Ser. No. 38,603

14 Claims. (Cl. 279—119)

The invention relates in general to chucks to rotatably support and grip a workpiece and more particularly to a chuck with an enlarged head relative to the rotatable body to circumscribe enlargements on a workpiece.

The usual chuck embraces a cylindrical or slightly conical section on a workpiece and the chuck jaws need only open and close sufficiently to release or grip this circular cross-section on the workpiece. Accordingly, where the workpiece is elongated the chuck may be provided with a hollow body to receive the elongated workpiece and still have the chuck jaws engage the workpiece near the end which is to be worked by a machine tool in which the chuck is carried.

The present invention relates to a chuck body which is hollow to receive an elongated workpiece and the head of the chuck is enlarged to the rear of the chuck jaws to receive and circumscribe an enlargement on the workpiece and still permit the chuck jaws to move inwardly to engage a small diameter portion on the workpiece. This small diameter portion may be the same diameter as that of the elongated portion of the workpiece received within the hollow chuck body.

Accordingly, an object of the invention is to provide a chuck which has a large movement of the chuck jaws to open wide to receive an enlarged portion on the workpiece and then to close a considerable distance to grip a smaller diameter portion on the workpiece.

Another object of the invention is to provide a chuck with a hollow body to receive an elongated axial portion of a workpiece and an enlarged housing rotating with the chuck body to receive an enlarged portion on the workpiece.

Still another object of the invention is to provide a chuck with a hollow body to receive an elongated portion of a workpiece and to receive an actuating sleeve with linkage between the actuating sleeve and jaws carried on the front face of the chuck. The jaws may be moved to grip the small diameter portion of the workpiece and the linkage disposed at a relatively larger radius than the actuating sleeve to establish an enlarged opening in the chucking housing to accommodate an enlarged portion on the workpiece.

Another object of the invention is to provide a chuck with an actuating sleeve which reciprocates to arcuately move a gear segment in turn pivoting a lever to actuate jaws on the chuck and with the gear segments and levers lying radially outwardly from the actuating sleeve to establish an enlarged opening in the chuck.

Other objects and a fuller understanding of this invention may be had by referring to the following description and claims, taken in conjunction with the accompanying drawings, in which:

Figure 2 is a front elevational view of Figure 1;

Figure 3 is a sectional view on line 3—3 in Figure 1; and

Figure 4 is a sectional view on line 4—4 of Figure 1.

Figure 1:
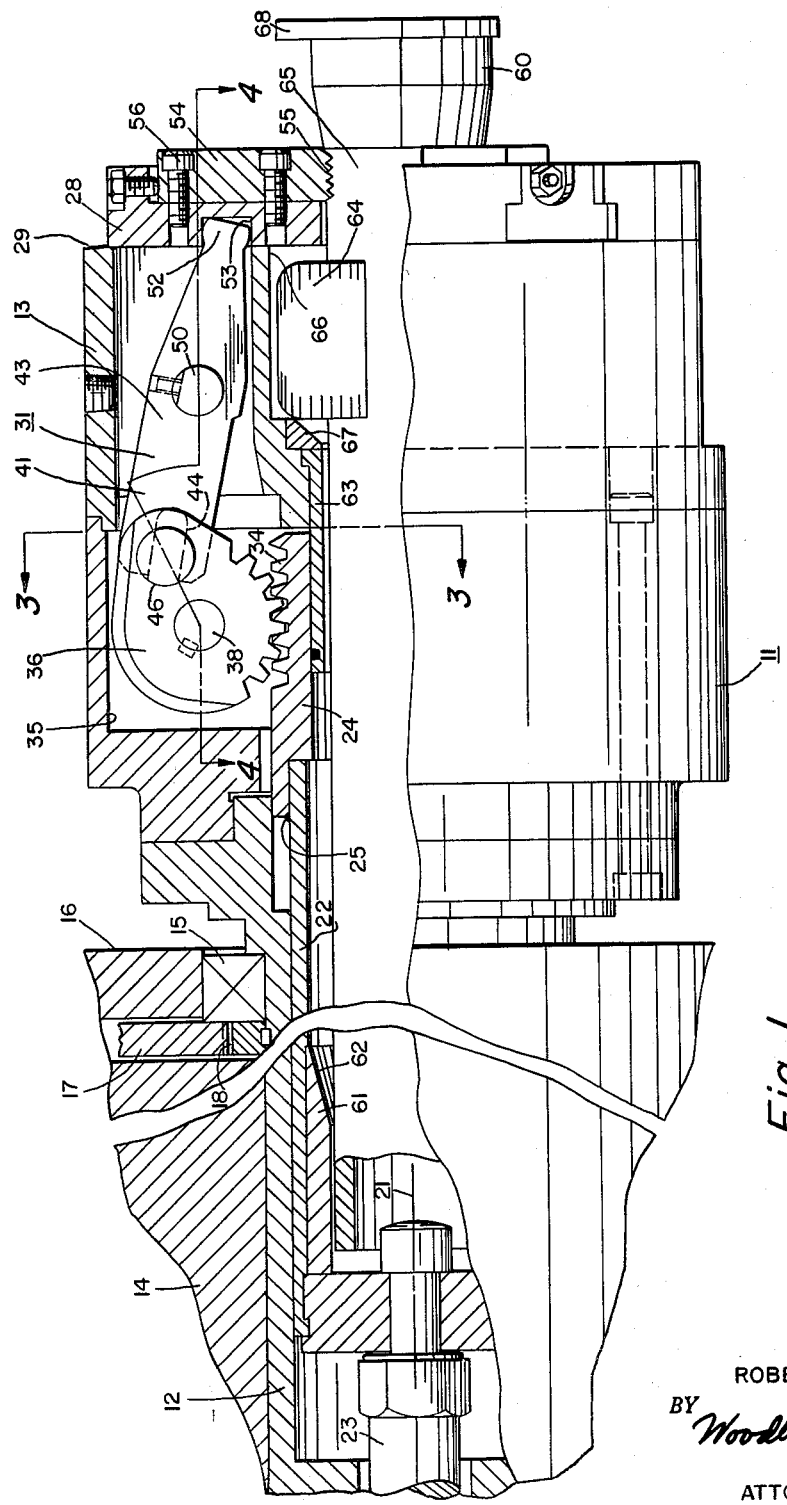
Figure 1 is a longitudinal view partially in section of a chuck embodying the invention.

The figures of the drawing show a chuck 11 which includes generally a chuck body 12 and a housing or head 13. The body 12 and housing 13 are fastened together for concurrent rotation and the body 12 is journalled for rotation relative to a machine tool 14 by suitable bearings, such as bearings 15. The machine tool has a front face 16, and a drive gear 17 within the machine tool is used to drive a gear 18 fixed to the chuck body 12. The machine tool 14 may be a multiple spindle automatic machine tool, for example, which has limited space for the rotating chuck body 12 and also limited space for the diameter of the chuck housing 13 to avoid interference with other chucks, tooling or workpieces.

The chuck body 12 and housing 13 are hollow and rotate about an axis 21. An actuating sleeve 22 is longitudinally disposed within the body 12 and rotates therewith, but is longitudinally slidable relative to the body 12 by push and pull motions of an actuating rod 23. This rod 23 may be moved in any suitable manner, such as by a cam within the machine tool 14. A rack sleeve 24 is fixedly attached to the outer end of the actuating sleeve 22 in any suitable manner, such as by weld metal 25. The chuck 11 may have any number of jaws 28 and these are shown as being three in number in this embodiment. The jaws 28 are carried on the front face 29 of the housing 13 by dovetail blocks 30. Linkage means 31 interconnects each jaw 28 and the rack sleeve 24. The rack sleeve 24 is provided with rack sections 34, in this case three in number, to coincide with the three jaws 28. These rack sections are equally spaced around the periphery of the rack sleeve 24.

The housing 13 is provided with pockets 35, each one to receive a gear segment 36. Pin bearings 37 are received within each pocket and journal an axle pin 38. Each gear segment 36 is keyed to the respective axle pin. Each gear segment 36 meshes with the respective rack section 34 to move arcuately as the actuating sleeve 22 is reciprocated.

Each gear segment 36 has a slot 40 receiving a first end 41 of a lever 43. The first end of each lever is forked as at 44 to embrace flattened portions 45 of a pin 46. The pins 46 have enlarged circular ends 47 which are journalled in the slotted end 40 of the gear segment 36. In this way the motion of the gear segment 36 is linked to the lever 43.

The lever 43 is pivoted on a cross pin 50 journalled on bearings 51 in the housing 13. Each lever 43 has a second or forward end 52 which is a cylindrical segment engaging a socket 53 in the respective jaw 28. Each jaw 28 carries a jaw insert 54 having work-engaging teeth 55 and fixed to the jaw 28 by screws 56.

The chuck 12 is adapted to engage and drive an elongated workpiece 60 which is axially elongated to be received within the actuating sleeve 22. An inner sleeve 61 with a conical portion 62 receives and centers the workpiece 60 as it is slid into the chuck 11. A centering sleeve 63 is also provided in the housing 13 to initially center the workpiece 60 as it is slid into the chuck 11 and this sleeve 63 slidably engages the rack sleeve 24 to keep chips out of the linkage means 31. The workpiece 60 may have an enlargement 64 to the rear of a small diameter portion 65, which portion 65 is that gripped by the jaws 28. The housing 13 has an enlarged opening 66 to the rear of the jaws 28 and forward of the gear segments 36 to receive this workpiece enlargement 64. A stop plate 67 is provided against which the workpiece enlargement 64 may abut to establish the axial position of the workpiece relative to the chuck 11. This enlarged opening 66 permits the workpiece enlargement 64 to be inserted within the chuck housing 13 and yet permits the chuck jaws 28 to engage the considerably smaller diameter portion 65 on the workpiece so that machining operations may be carried out with much greater accuracy on the exposed end of the workpiece 60. This exposed end may include a flange, for example.

*Operation*

The chuck 11 is shown in the closed condition with the actuating sleeve 22 in its forward limit position. If this actuating sleeve 22 through the agency of the actuating rod 23 is retracted to the left in Figure 1, the gear segment 36 will partially rotate clockwise and this will partially rotate the lever 43 counterclockwise. The cylindrical segment 52 acts in the socket 53 to retract the jaws 28 radially outwardly and this radial retraction is sufficient to move the jaw teeth 55 radially outwardly a distance equal to the inside dimension on the enlarged opening 66. Accordingly, the workpiece 60 may be axially withdrawn from the chuck 11. This would be after the completion of machining on the workpiece 60 and then a new workpiece blank could be inserted in the chuck 11. Such workpiece 60 would be inserted until the enlargement abutted the stop plate 67 and then the actuating sleeve 22 would be actuated forwardly. This would partially rotate counterclockwise the gear segments 36, partially rotating clockwise the levers 43 and moving radially inwardly the jaws 28 to grip and drive the workpiece 60.

It will be seen that the gear segments 36 and levers 43 are a part of the linkage means 31 extending between the actuating sleeve 22 and the jaws 28. The gear segments 36 are first members which are positioned radially outwardly, and in this case are journalled on axes lying radially outwardly, relative to the actuating sleeve 22. Also the levers 43 are links or second members lying radially outwardly, and in this case journalled on axes lying radially outwardly, relative to the actuating sleeve 22. The fact that the levers 43 do lie at a considerably greater distance from the axis 21 relative to the actuating sleeve 22 establishes room within the housing 13 for the enlarged opening 66. This establishes considerably greater space within the chuck housing 13 for the workpiece enlargement 64 than the space within the chuck body 12. As shown the largest effective radius of the workpiece enlargement 64 is more than double the radius of the workpiece 60 which is receivable within the actuating sleeve 22. This permits chucking a workpiece which has an elongated portion of a given diameter and also has an enlargement which may or may not be of circular cross-section and still permits chucking or gripping of the workpiece at a relatively small diameter portion closely adjacent the actual exposed portion of the workpiece to be machined.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A chuck to receive an axially elongated workpiece having an enlargement near one end and a smaller diameter circular portion outboard of the enlargement, said chuck comprising, in combination, a housing rotatable about an axis, actuating means coaxially disposed in said housing and movable with respect thereto, a front face on said housing, jaw means carried near said front face and movable in paths having a radial component, an enlarged opening in said housing to the rear of said housing face and forward of said actuating means, said jaw means adapted to open and close along said paths to grip the small diameter portion of the workpiece forward of the enlargement thereon, first and second members interconnecting said actuating means and said jaw means to actuate said jaw means in accordance with movements of said actuating means, said first and second members disposed radially outwardly of said actuating means, and said second members lying radially outwardly of said enlarged opening.

2. A chuck to receive an axially elongated workpiece having an enlargement near one end and a smaller diameter circular portion outboard of the enlargement, said chuck comprising, in combination, a hollow housing rotatable about an axis, a hollow actuating sleeve coaxially disposed in said housing and rotatable therewith and movable with respect thereto, a front face on said housing, a plurality of jaws carried on said front face and movable in paths having a radial component, an enlarged opening in said housing to the rear of said housing face and forward of said actuating sleeve, said jaws adapted to close along said paths to a diameter less than the inside diameter of said actuating sleeve to grip the small diameter portion of the workpiece forward of the enlargement thereon and with said workpiece disposed partially inside said actuating sleeve, first and second members interconnecting said actuating sleeve and each jaw to actuate said jaw in accordance with movements of said sleeve, said first and second members disposed radially outwardly of said sleeve, said first members pivoting on first axes carried in said housing, and said second members lying radially outwardly of said enlarged opening.

3. A chuck to receive an axially elongated workpiece having an enlargement near one end and a smaller diameter circular portion outboard of the enlargement, said chuck comprising, in combination, a hollow housing rotatable about an axis, a hollow actuating sleeve coaxially disposed in said housing and rotatable therewith and longitudinally movable with respect thereto, a front face on said housing, a plurality of jaws carried on said front face and movable in paths having a radial component, an enlarged opening in said housing to the rear of said housing face and forward of said actuating sleeve, said enlarged opening having at least twice the radius of the inside diameter of said actuating sleeve, said jaws adapted to close along said paths to a diameter less than the inside diameter of said actuating sleeve to grip the small diameter portion of the workpiece forward of the enlargement thereon and with said workpiece disposed partially inside said actuating sleeve, first and second members interconnecting said actuating sleeve and each jaw to actuate said jaw in accordance with movements of said sleeve, said first and second members disposed radially outwardly of said sleeve, said first members pivoting on first axes carried in said housing, said second members pivoting on second axes carried in said housing at positions lying radially outwardly of said enlarged opening, and said second members having a pivotal connection with the respective jaws.

4. A chuck, comprising, in combination, a housing having an axis of rotation and a front face, actuating means coaxially within said housing and rotatable therewith and adapted for actuation relative thereto from the rear of said housing, a plurality of first members in said housing disposed outwardly of said actuating means, a longitudinally disposed second member for each first member and disposed in said housing radially outward of said actuating means, each second member having first and second ends, means connecting said first members to said actuating means and to a respective second member first end to move the second members upon movement of said actuating means, a laterally movable chuck jaw near the front face of said housing for each said second member, means interconecting each said chuck jaw with the second end of the respective second member, said housing having an enlarged opening relative to the jaw opening to the rear of said chuck jaws and forward of said first members to accommodate enlargements on a workpiece engageable by said chuck jaws, whereby said actuating means may be moved in a first direction relative to said housing to move said first and second members to move the chuck jaws inwardly for engagement with a small diameter portion of any said workpiece at a position forward of the enlargement on the workpiece.

5. A chuck, comprising, in combination, a housing having an axis of rotation and a front face, an actuating member within said housing and rotatable therewith and adapted for movements relative thereto, a plurality of first members journalled on said housing on pivot axes radially outward of said actuating member, a longitudinally disposed second member for each first member and disposed in said housing radially outward of said actuating member, each second member having first and second ends, means connecting said first members to said actuating member and to a respective second member first end to move the second members upon movement of said actuating member, a radially movable chuck jaw on the front face of said housing for each said second member, means interconnecting each said chuck jaw with the second end of the respective second member, said housing having an enlarged opening relative to the jaw opening to the rear of said chuck jaws and forward of said first members to accommodate enlargements on a workpiece engageable by said chuck jaws, whereby said actuating member may be moved in a first direction relative to said housing to partially rotate said first members and moves said second members to move the chuck jaws inwardly for engagement with a small diameter portion of any said workpiece at a position forward of the enlargement on the workpiece.

6. A chuck, comprising, in combination, a housing having an axis of rotation and a front face, a draw sleeve within said housing and rotatable therewith and adapted for longitudinal sliding movements relative thereto, a plurality of first members journalled on said housing on pivot axes radially outward of said sleeve, a longitudinally disposed link for each member and disposed in said housing radially outward of said sleeve, each link having first and second ends, means connecting said members to said sleeve and to a respective link first end to move the links upon movement of said sleeve, a radially movable chuck jaw on the front face of said housing for each said link, means interconnecting each said chuck jaw with the respective link second end, said housing having an enlarged opening relative to the jaw opening to the rear of said chuck jaws and forward of said members to accommodate enlargements on a workpiece engageable by said chuck jaws, whereby said sleeve may be reciprocated longitudinally in a first direction to partially rotate said members and move said links to move the chuck jaws inwardly for engagement with a small diameter portion of any said workpiece at a position forward of the enlargement on the workpiece.

7. A chuck, comprising, in combination, a housing having an axis and a front face, a draw sleeve within said housing and rotatable therewith and adapted for longitudinal sliding movements relative thereto, a plurality of members journalled on said housing on pivot axes radially outward of said sleeve, a longitudinally disposed lever for each member and pivoted on said housing on pivot axes radially outward of said sleeve, each lever having first and second ends, means linking said members to said sleeve and to a respective lever first end to move the lever first end in an outward direction relative to said axis upon a first longitudinal movement of said sleeve, a radially movable chuck jaw on the front face of said housing for each said lever, means interconnecting each said chuck jaw with the respective lever second end, said housing having an enlarged opening relative to the jaw opening to the rear of said chuck jaws and forward of said members to accommodate enlargements on a workpiece engageable by said chuck jaws, whereby said sleeve may be reciprocated longitudinally in said first direction to partially rotate said members and pivot said levers to move the chuck jaws inwardly for engagement with a small diameter portion of any said workpiece at a position forward of the enlargement on the workpiece.

8. A chuck for a machine tool having a face, comprising, in combination, a housing rotatable relative to the machine tool, a draw sleeve within said housing and rotatable therewith and adapted for longitudinal sliding movements relative thereto, a plurality of segments journalled on said housing on pivot axes radially outward of said sleeve means linking said segments to said sleeve to move a portion of said segments in a path having a radially outward component upon a longitudinal forward movement of said sleeve, a longitudinally disposed lever for each segment and pivoted on said housing on pivot axes radially outward of said sleeve, each lever having first and second ends, means interconnecting each said segment portion and the first end of the respective lever, a radially slidable chuck jaw on the front face of said housing for each said lever, means interconnecting each said chuck jaw with the respective lever second end, said housing having an enlarged opening relative to the jaw opening to the rear of said chuck jaws and forward of said segments to accommodate enlargements on a workpiece engageable by said chuck jaws, whereby said sleeve may be reciprocated longitudinally forwardly to partially rotate said segments and pivot said levers to move the chuck jaws inwardly for engagement with a small diameter portion of any said workpiece at a position forward of the enlargement on the workpiece.

9. A gear lever chuck for a machine tool having a face, comprising, in combination, a housing rotatable relative to the machine tool, a draw sleeve within said housing and rotatable therewith and adapted for longitudinal sliding movements relative thereto, a plurality of rack sections carried on said sleeve within said housing, a gear segment meshed with each rack section and journalled on said housing, a longitudinally disposed lever for each gear segment and pivoted on said housing, each lever having first and second ends, means interconnecting each said gear segment and the first end of the respective lever, a chuck jaw for each said lever, means interconnecting each said chuck jaw with the respective lever second end, said housing having an enlarged opening relative to the jaw opening to the rear of said chuck jaws and forward of said rack sections to accommodate enlargements on a workpiece engageable by said chuck jaws, whereby said sleeve and rack sections may be reciprocated longitudinally to partially rotate said gear segments and pivot said levers to move the chuck jaws inwardly for engagement with a small diameter portion of any said workpiece at a position forward of the enlargement on the workpiece.

10. A gear lever chuck for a machine tool having a face, comprising, in combination, a housing rotatable relative to the machine tool, a draw sleeve within said housing and rotatable therewith and adapted for longitudinal sliding movements relative thereto, a plurality of rack sections carried on said sleeve within said housing, a gear segment meshed with each rack section and journalled on said housing, a longitudinally disposed lever for each gear segment and pivoted on said housing, each lever having first and second ends, means interconnecting each said gear segment and the first end of the respective lever, a radially slidable chuck jaw on the front face of said housing for each said lever, means interconnecting each said chuck jaw with the respective lever second end, said housing having an enlarged opening relative to the jaw opening to the rear of said chuck jaws and forward of said rack sections to accommodate enlargements on a workpiece engageable by said chuck jaws, whereby said sleeve and rack sections may be reciprocated longitudinally to partially rotate said gear segments and pivot said levers to move the chuck jaws inwardly for engagement with a small diameter portion of any said workpiece at a position forward of the enlargement on the workpiece.

11. A gear lever chuck for a machine tool having a face, comprising, in combination, a rotatable hollow body rotatable within the machine tool, a sleeve within said body and rotatable therewith and adapted for longitudinal sliding movements relative thereto, a plurality of rack sections carried on said sleeve forward of the machine tool face, a gear segment meshed with each rack section and journalled relative to said body, a longitudinally disposed lever for each gear segment and pivoted relative to said body, each lever having first and second ends, means interconnecting each said gear segment and the first end of the respective lever, a radially slidable chuck jaw on the front face of said body for each said lever, means interconnecting each said chuck jaw with the respective lever second end, said body having an enlarged opening relative to said sleeve to the rear of said chuck jaws and forward of said rack sections to accommodate enlargements on a workpiece receivable in said hollow body and engageable by said chuck jaws, whereby said sleeve and rack sections may be reciprocated longitudinally to partially rotate said gear segments and pivot said levers to move the chuck jaws inwardly for engagement with a small diameter portion of any said workpiece at a position forward of the enlargement on the workpiece.

12. A gear lever chuck for a machine tool having a face, comprising, in combination, a rotatable hollow body rotatable within the machine tool, a draw sleeve within said body and rotatable therewith and adapted for longitudinal sliding movements relative thereto, an enlarged hollow housing fixed on the front of said body exterior to the face of the machine tool, a plurality of rack sections carried on said sleeve within said housing, a gear segment meshed with each rack section and journalled on said housing, a longitudinally disposed lever for each gear segment and pivoted on said housing, each lever having first and second ends, means interconnecting each said gear segment and the first end of the respective lever, a radially slidable chuck jaw on the front face of said housing for each said lever, means interconnecting each said chuck jaw with the respective lever second end, said housing having an enlarged opening relative to said hollow body to the rear of said chuck jaws and forward of said rack sections to accommodate enlargements on a workpiece receivable in said hollow body and engageable by said chuck jaws, whereby said sleeve and rack sections may be reciprocated longitudinally to partially rotate said gear segments and pivot said levers to move the chuck jaws inwardly for engagement with a small diameter portion of any said workpiece at a position forward of the enlargement on the workpiece.

13. A gear lever chuck for a machine tool having a face, comprising, in combination, a rotatable hollow body rotatable within the machine tool, a draw sleeve within said body and rotatable therewith and adapted for longitudinal sliding movements relative thereto, an enlarged hollow housing fixed on the front of said body exterior to the face of the machine tool, three rack sections carried on said sleeve within said housing, three gear segments journalled on said housing each meshed with a corresponding one of the rack sections, a longitudinally disposed lever for each gear segment and pivoted on said housing, each lever having first and second ends, a pivot axle interconnecting each said gear segment and the first end of the respective lever, a radially slidable chuck jaw on the front face of said housing for each said lever, means interconnecting each said chuck jaw with the respective lever second end, said housing having an enlarged opening relative to said hollow body to the rear of said chuck jaws and forward of said rack sections to accommodate enlargements on a workpiece receivable in said hollow body and engageable by said chuck jaws, whereby said sleeve and rack sections may be reciprocated longitudinally forwardly to partially rotate said gear segments and pivot said levers to move the chuck jaws inwardly for engagement with a small diameter portion of any said workpiece at a position forward of the enlargment on the workpiece.

14. A gear lever chuck for a machine tool having a face, comprising, in combination, a rotatable hollow body rotatable within the machine tool, a draw sleeve within said body and rotatable therewith and adapted for longitudinal sliding movements relative thereto, an enlarged hollow housing fixed on the front of said body exterior to the face of the machine tool, three rack sections carried on said sleeve within said housing, three gear segments journalled on said housing each meshed with a corresponding one of the rack sections, a longitudinally disposed lever for each gear segment and pivoted intermediate the ends thereof on said housing, each lever having first and second ends, said first ends being forked, a pivot axle interconnecting each said gear segment and the forked first end of the respective lever, a cylindrical segment on said second end of each lever, a chuck jaw slidably retained on the front face of said housing for each said lever and slidable in a radial direction, a socket on the rear of each said chuck jaw engageable with the respective cylindrical segments, said housing having an enlarged opening relative to said hollow body to the rear of said chuck jaws and forward of said rack sections to accommodate enlargements on a workpiece receivable in said hollow body and engageable by said chuck jaws, whereby said sleeve and rack sections may be reciprocated longitudinally forwardly to partially rotate said gear segments and pivot said levers to move the chuck jaws inwardly for engagement with a small diameter portion of any said workpiece at a position forward of the enlargement on the workpiece.

References Cited in the file of this patent

UNITED STATES PATENTS

| | | |
|---|---|---|
| 1,698,254 | Bullard | Jan. 8, 1929 |
| 1,780,390 | Hopkins | Nov. 4, 1930 |
| 2,722,427 | Labeyrie | Nov. 1, 1955 |
| 2,737,396 | Bailey | Mar. 6, 1956 |